United States Patent [19]

Dreyfus

[11] 3,838,217

[45] Sept. 24, 1974

[54] AMPLITUDE REGULATOR MEANS FOR SEPARATING FREQUENCY VARIATIONS AND AMPLITUDE VARIATIONS OF ELECTRICAL SIGNALS

[76] Inventor: Jean Albert Dreyfus, 5, Avenue de la Grenade, Geneva, Switzerland

[22] Filed: Mar. 1, 1971

[21] Appl. No.: 122,612

[30] Foreign Application Priority Data

Mar. 4, 1970 Switzerland .......... 3056/70
Sept. 22, 1970 Switzerland .......... 13922/70

[52] U.S. Cl. .......... 179/1 A
[51] Int. Cl. .......... H04r 3/00
[58] Field of Search .......... 179/1 A, 1 F, 1 SA; 330/25

[56] References Cited

UNITED STATES PATENTS

| | | | |
|---|---|---|---|
| 2,148,030 | 2/1939 | McLennan | 179/1 D |
| 2,262,846 | 11/1941 | Herold | 179/1 D |
| 2,269,011 | 1/1942 | Dallos | 179/1 D |
| 3,229,049 | 1/1966 | Goldberg | 179/1 F |
| 3,497,621 | 2/1970 | Erath | 179/1 D |
| 3,571,529 | 3/1971 | Gharib | 179/1 F |

*Primary Examiner*—Kathleen H. Claffy
*Assistant Examiner*—Douglas W. Olms
*Attorney, Agent, or Firm*—Werner W. Kleeman

[57] ABSTRACT

Amplitude regulator for electrical signals connected to filter means, comprising an amplifier, the gain of which can be varied by a loop chain incorporating a loop amplifier, a rectifier and a low-pass filter.

The amplitude regulator can comprise a first amplifier the gain of which can be varied in the reverse direction (feedback) by a first loop chain, and a second amplifier the gain of which can be varied in the forward direction (feed forward) by a second loop chain, the output signal of the first amplifier being connected to the input of the loop chain of the second amplifier and further the input signal of the first amplifier becoming the input signal of the second amplifier. Such a "double loop amplitude regulator" allows to separate the spectrum information (frequency variations) from the dynamics variation (amplitude variation).

The filter means and the electrical parameters may be selected in such a way:

that a fundamental frequency of an input signal can be extracted;

that further the spectrum components of an input signal can be equalized;

that further the build-up and the decaying time constants of the loop chain signal can be regulated independently from another;

that further the boundaries of the filter means can be moved in response to the variations of the frequency components of said input signals.

9 Claims, 26 Drawing Figures

AMPLITUDE REGULATOR MEANS FOR SEPARATING FREQUENCY VARIATIONS AND AMPLITUDE VARIATIONS OF ELECTRICAL SIGNALS

BACKGROUND AND SUMMARY OF THE INVENTION

The present invention concerns improvements in amplitude regulators for electrical signals carrying information related to images or sounds. These amplitude regulators may be used for example in connection with apparatuses for transmission, or recognition of electrical signals representing speech or music. They allow to separate the spectrum information (represented by frequency variation) from the dynamics information (represented by amplitude variation). They may be used for the extraction of pitch, spectrum and stress of speech, and also for optimal adaptation of telephone lines or hearing aids.

A known amplitude regulator is an amplifier of which the gain A is automatically regulated by the quasi-stationary amplitude of the input signal $S_1$ or of the output signal $S_2$ whereas this amplitude regulator includes a regulating loop with an amplifier, a rectifier and a low-pass filter.

It is termed a "compressor" or "expander," sometimes also referred to as a dynamic compressor or dynamic expander, depending upon whether the gain A is in an opposing or unidirectional sense relative to the output signal $S_2$, that is depending upon whether the variation of the gain is reduced or increased.

The regulation factor R, which will simply be referred to as "regulation," is the ratio or relationship of the variations of an output level ($\log S_2$) to that of the input level ($\log S_1$). In other words it can be expressed by the equation $R = \Delta \log S_2 : \Delta \log S_1$.

It is possible to differentiate between "reverse-regulation-loop" and "forward-regulation-loop" depending upon whether the gain is varied by feedback of the output signal $S_2$ or directly by the input signal $S_1$. Hereinafter both regulation techinques will be denoted by the reference characters "*r*" for reverse regulation and "*v*" for forward regulation.

The following must here be remembered: the known amplitude compressor provides an output signal $S_2$ which is approximately proportional to the logarithm of the input signal, $\log S_1$. The inverse function of $S_2 \approx \log S_1$ is an exponential function $S_1 \approx 2^{S_2}$. Consequently the regulation $R$ does not remain constant between the minimum value $S_{1min}$ and the maximum value $S_{1max}$, rather it varies approximately as $R \approx 1/S_2 \approx 1/\log S_1$.

The known devices, such as "volume controls," "companders," "level balancers" for hearing devices, and so forth, follow this function, which also corresponds to the pseudo "physiological law of Weber-Fechner." As a result, there appear diverse drawbacks regarding the relationship of "signal-to-noise-ratio."

According to a first, aspect of the present invention the amplitude regulator is provided with two regulation loops, one for reverse regulation, the other for forward regulation, both loops complementing one another. Briefly, the inventive amplitude regulator can be called a "double loop amplitude regulator."

Consequently, the regulation R remains approximately constant between $S_{1min}$ (= threshold) and $S_{1max}$ (= saturation). The inverse function of $\log S_2 = R \log S_1$ is not an exponential function, rather a power function $S_2 \approx S^R_1$, wherein the exponent R (which equals regulation) can assume any desired value, greater than 1 in the case of expansion, or less than 1 in the case of compression. The average value of the regulation $R$ can even be zero or null (total compression) or negative (hyper-compression).

Each of both regulation loops for itself provides an exponential function, collectively however they provide a power function.

The inventive apparatus permits obtaining every desired variation of the output level $\log S_2$ as a function of the input-level $\log S_1$. It allows to separate the frequency variations from the amplitude variations.

On the other hand pitch extractors are known to present various difficulties like: separation of formants from fundamental frequency, separation of voiced sounds like "*j*" from unvoiced sounds like "sh," extension of the fundamental frequency field over one or two octaves.

According to a second aspect of the present invention an amplitude regulator is used for regenerating the fundamental frequency in the following manner: the input signal $S_1$ is filtered by a steep low-pass filter and a band-pass filter in the regulating loop regenerates the amplitude of the fundamental frequency. In consequence the fundamental frequency is freed from harmonics or formants and its amplitude is regulated over an extended field.

According to a third aspect of the present invention the spectral components of the input signal $S_1$ are equalized by a band-pass associated with a band-stop filter centered for example near 1,300 Hz. In consequence the energy of open phonemes like "*a*" are reduced to the average level of other phonemes. Consequently, the output levels are easier to regulate.

According to a fourth aspect of the present invention the regulating loop includes a supplementary rectifier located after the low-pass. The rectifier allows the adjustment of the ascending slope of the loop signal independently from its descending slope. Thus, transitory information of signals can be saved.

According to a fifth aspect of the present invention the boundaries of frequency filters can be automatically varied by resistance changes or semiconductors such as photodiodes, or field-effect transistors.

According to a sixth aspect of the present invention amplitude regulators may be inserted in telephone devices or hearing aid devices in order to improve comprehensibility or to optimalize the information capacity (bit/second).

It has been demonstrated in different publications that the hearing perception does not follow the exponential "law of Weber-Fechner," rather a power law. Generally speaking the exponential law expresses the transmission of information, whereas the power law expresses automatic regulation, i.e., cybernetics. This word expresses regulating laws which are common to living organisms and to machines.

The inventive apparatus can serve for regulation or control of every type of electrical signals which, for instance, are capable of representing sound or images.

The accompanying drawings illustrate the principle of the invention as well as a number of special exemplary situations of use of the present invention, especially in connection with sound recognition apparatus, such as sonographs, phonetographs, phonetic actuators or "phonactors", melographs or melody indicators as well as telephone- and hearing aid devices.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
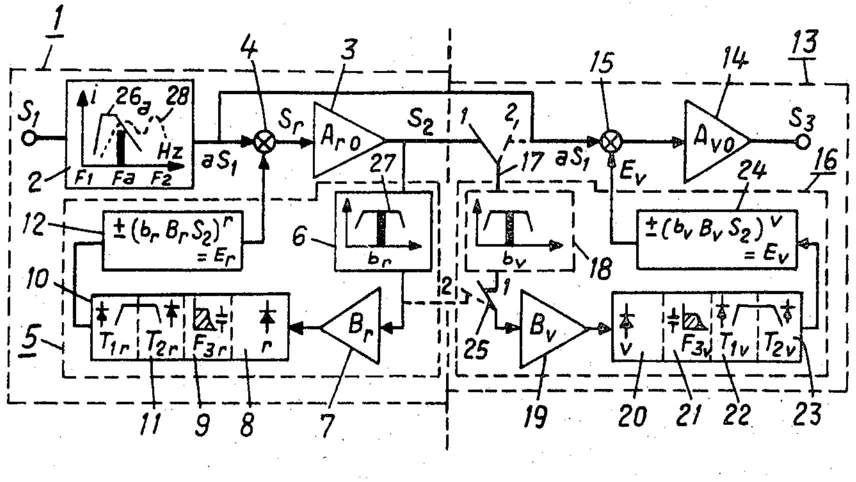
FIG. 1 is a circuit diagram of a single or double loop amplitude regulator by means of which the equations thereof will be explained.

Describing now the drawings in FIG. 1 there is illustrated the functional circuit diagram of a "figure eight" double loop regulator. Looking first to the left-half of this circuit diagram such will be seen to represent a reverse (feedback) regulation loop 1, simply denoted by the reference character "*r*."

The amplitude spectrum of the input signal $S_1$ can be of any shape. In the case of sound it can vary between 16 Hz to 16,000 Hz. In the case of a telephone connection it can only vary from 300 Hz to 3,400 Hz, wherein the weakening or attenuation of the amplitude is 9 dB/octaves beneath 300 Hz, or 18 dB/octaves above 3,400 Hz, by way of example.

The active or passive input filter 2 can weaken or strengthen any frequency groups between the boundary frequencies $F_1$ and $F_2$. In order to simplify the illustration and consideration of the invention there should be initially considered a single frequency $F_a$ which is passed by the input filter with the weakening factor $a \leq 1$, resulting in the filter amplitude $aS_1$.

Each amplifier with automatic gain variation can be replaced by a constant amplifier 3 with a preceding multiplier node 4. The amplifier 3 possesses a constant gain $A_{ro}$ which is the extremum value with open loop. The multiplier node 4 corresponds, for instance, to the variable slope of electronic tubes in a push-pull configuration, or the variable resistance of semiconductors, such as photodiodes or field-effect transistors. In this node 4 the input signal $aS_1$ is multiplied by the error signal $E_r$ in order to produce a corrected signal $S_r$, which is multiplied by the constant gain $A_{ro}$ in order to deliver the output signal $S_2$.

The error signal $E_r$ is delivered by the regulation chain 5 of the reverse loop, where there can be recognised and distinguished the following components:

a. A loop-filter 6 with the attenuation factor $b_r \leq 1$ for the considered frequency $F_a$;

b. A loop amplifier 7 with adjustable gain $B_r$;

c. A rectifier 8 with exponent $r = 1$ or 2, for instance when dealing with linear or quadratic rectification.

d. A low-pass filter 9 with the boundary frequency $F_{3r}$ (hertz), which corresponds to the "time window" $t_m(\text{sec}) \approx 1 : F_3$ and with the condition $F_3 \leq F_1 \leq F_a$.

e. Possibly also a phase shifter 10, 11 with the rectifier 10 or 11 which allows for adjustment of the build-up time-constant $T_{1r}$ separately from the decaying time-constant $T_{2r}$.

f. A linear to exponential converter 12 which transforms the (linear) chain signal $L_r = (b_r B_r S_2)^r$ into the (exponential) error signal $E_r = 2^{\pm L_r}$.

The "plus" or "minus" sign appearing in front of the exponent $L_r$ designates the expansion or compression, respectively. With an open loop, that is when the error signal $E_r$ is separated from the multiplier node 4 there is obtained the Equation 1 $S_2 = S_r \cdot A_{ro}$, wherein $S_r =$ $aS_1$. Thus the output signal $S_2$ is equal to the input signal $aS_1$ multiplied by the extremum gain $A_{ro}$.

On the other hand, if the loop is closed then there comes into play Equation 2 $S_r = aS_1 \cdot E_r$, wherein the error signal $E_r = 2^{\pm L_r}$, with $L_r = (b_rB_rS_2)^r$, is a positive or negative exponential function, depending upon whether one is dealing with expansion or compression.

If Equations 1 and 2 are combined then the values $E_r$ and $S_r$ are eliminated. Thus there is obtained Equation 3 $S_2 = A_{ro} \cdot aS_1 \cdot 2^{\pm L_r}$, or Equation 4 $\log S_2 = \log (aS_1) \pm (b_rB_rS_2)^r + \log A_{ro}$. It is here mentioned that if nothing further is stated one is dealing with, in each case, binary logarithms (base 2).

If $\log S_2$, $\log(aS_1)$ and $b_rB_r$ are greater than 1, then $\log S_2$ need not be taken into account in relation to $S_2$. Furthermore, if the extremum gain $A_{ro}$, as well as the exponent $r$, are equal to 1, then in the case of compression the Equation 10 simplifies in to Equation 10*a* $S_2 = \log (aS_1) : b_rB_r$. Therefore, it can be seen that $S_2$ increases proportionally with the logarithm of $S_1$, or that $S_1$ is an exponential function of $S_2$. The regulation $R = \Delta \log S_2 : \Delta \log S_1$ increases thus with $S_2$ (when $S_2 \geqslant 1$) and is in no way constant as would be desired in the ideal situation.

In contrast to "ideal regulation" it is possible to speak in terms of "actual or real regulation" for the simple loop, which follows a simple logarithmic function.

There will now be considered what happens when the right-half of FIG. 1 comes into play, which embodies a forward (feed forward) loop "$v$."

There will be seen a second amplifier 13 with variable gain $A_2$ which, however, is replaced by the constant amplifier 14 with the extreme gain $A_{vo}$ with open loop, and by the multiplier node 15. The reverse regulator "$r$" is supplemented by the forward regulator "$v$." *The input signal* $S_1$ remains the same for both regulators, but however both loops 5 and 16 describe a figure eight curve with $S_2$ as the intermediate value and $S_3$ as the output signal.

If the switch 17 were located at position 2 then the loop "$v$" would correspond to that of a simple forward amplifier. However, this switch is located at position 1 so that the output signal $S_2$ of the regulator "$r$" becomes the input signal of the forward chain "$v$." Such contains the components 18 to 24 which are symmetrically arranged to the components 7 to 12, yet however are forward of the node 15.

The Equations 5 to 8 are similarly developed as the Equations 1 to 4 only that the index "$r$" (reverse) in each case is replaced by the index "$v$" (forward).

If the rectifier exponents $r$ and $v$ are equal then $S^r_2$ equals $S^v_2$. Thus the expression $S^r_2$ of Equation 10 can be substituted for $S^v_2$ in Equation 8. There is thus obtained the Equations 13 and 14 as well as 16 and 17, from which there has disappeared the intermediate value $S_2$.

$$\log S_3 = (1 \pm B) \cdot \log (aS_1) \pm B \log A_{ro} + \log A_{vo}; \quad (13)$$

$$B = (b_vB_v)^v : (b_rB_r)^r$$

or, if $r = v = a = A_{ro} = A_{vo} = 1$ :

$$\log S_3 = R \cdot \log S_1;\ S_3 = S^R{}_1;\ R = 1 \pm B; \quad (16)$$

$$B = b_vB_v : b_rB_r \quad (17)$$

Therefore it will have been found that the composite of two "real regulators" can provide an "ideal regulator" within certain limits.

There is namely obtained according to Equation 16 $\log S_3 = R \cdot \log S_1$, or $S_3 = S^R{}_1$, wherein the regulation $R = 1 \pm (b_vB_v : b_rB_r)$. Therefore, one is concerned with a double logarithmic function, or a power function, with the constant regulation R serving as the exponent.

However still further possibilities are available: if the loop gains $B_r$ and $B_v$ are equal (also with $b_r = b_v$, and with switch 25 at position 2) then there is obtained a compression which is not only "ideal," rather also is "total." In other words $R = 1 - (B_v : B_r) = 1 - 1 = 0$. Stated in another way: even if the input level varies by 60 dB the output level remains constant.

If $B_v$ is chosen to be greater than $B_r$ there is further obtained a "negative" compression, that is, the output peak increases when the input peak increases, which represents a different type of expansion.

On the basis of the left-hand portion of FIG. 1 it is possible to explain additional inventive apparatuses which are already valid with the simple reverse loop:

1. If the input filter 2 is a high-pass according to curve 26 and with a boundary frequency of approximately 100 Hz, and if the loop filter 6 is a band-pass according to curve 27, for instance with boundary frequencies of, for instance, 100 Hz and 600 Hz, then there is thus provided the basis for a pitch extractor: the higher frequency components are namely attenuated whereas the base or fundamental frequency amplitude is relatively amplified and regnerated.

2. Irregularities of the input spectrum can be compensated by a filter curve 28, whereby then further corrections take place by means of the loop filter 6.

3. The build-up- and dying-out-time constants $T_{1r}$ and $T_{2r}$ can be separately regulated. As a result, both flanks of the time window can be optimumly accommodated in order to save the information of the build-up and decaying time-constants $T_{1r}$.

The previously developed Equations 13 and 14 relate to quasi-stationary operations. The parameters contained therein already enable carrying out many different compression- and expansion programs.

Figure 2:
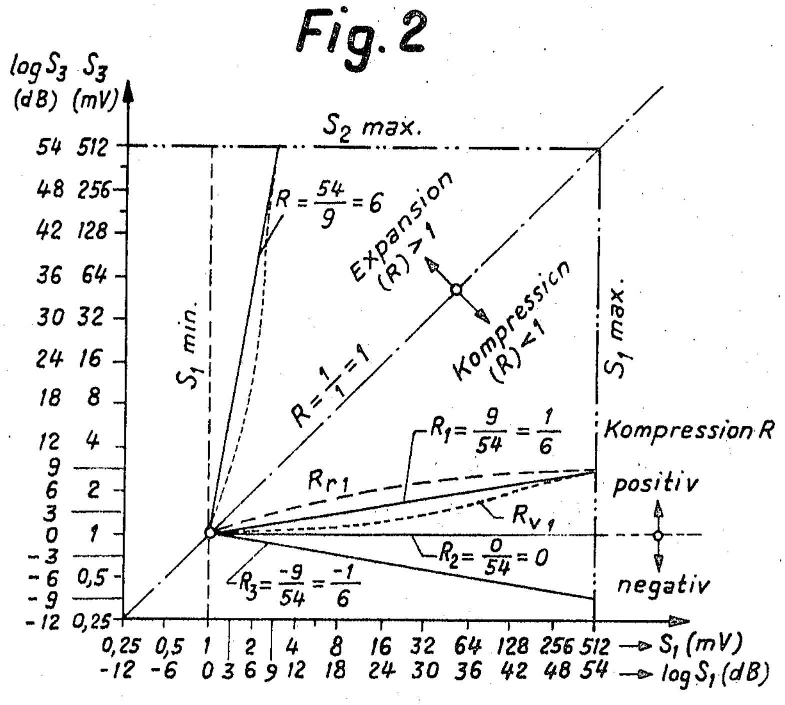
FIG. 2 illustrates the regulation curves corresponding to the equations of FIG. 1.

FIG. 2 graphically depicts the behaviour of Equation 16 $\log S_3 = R \cdot \log S_1$, wherein $R = 1 - (B_v : B_r)$, in a double logarithmic coordinate system.

The straight line with a slope of 45° separates the region of the expansion ($|R| > 1$) from that of compression ($|R| < 1$). The "ideal" compression line with $R_1 = 9$ dB : 54 dB $= 1 : 6$ results from the convex reverse regulation curve $R_{r1}$, which is exactly compensated by the concave forwarded-regulation curve $R_{v1}$.

The horizontal line $R_2 = 0 : 54 = 0$ indicates "total" compression. The downwardly inclined line with $R_3 = -9/54 = -1/6$ indicates "negative" or "hyper" — compression, representing a different type of expansion. The upwardly inclined line $R_4 = 54/9 = 6$ indicates "ideal" expansion.

Figure 3:
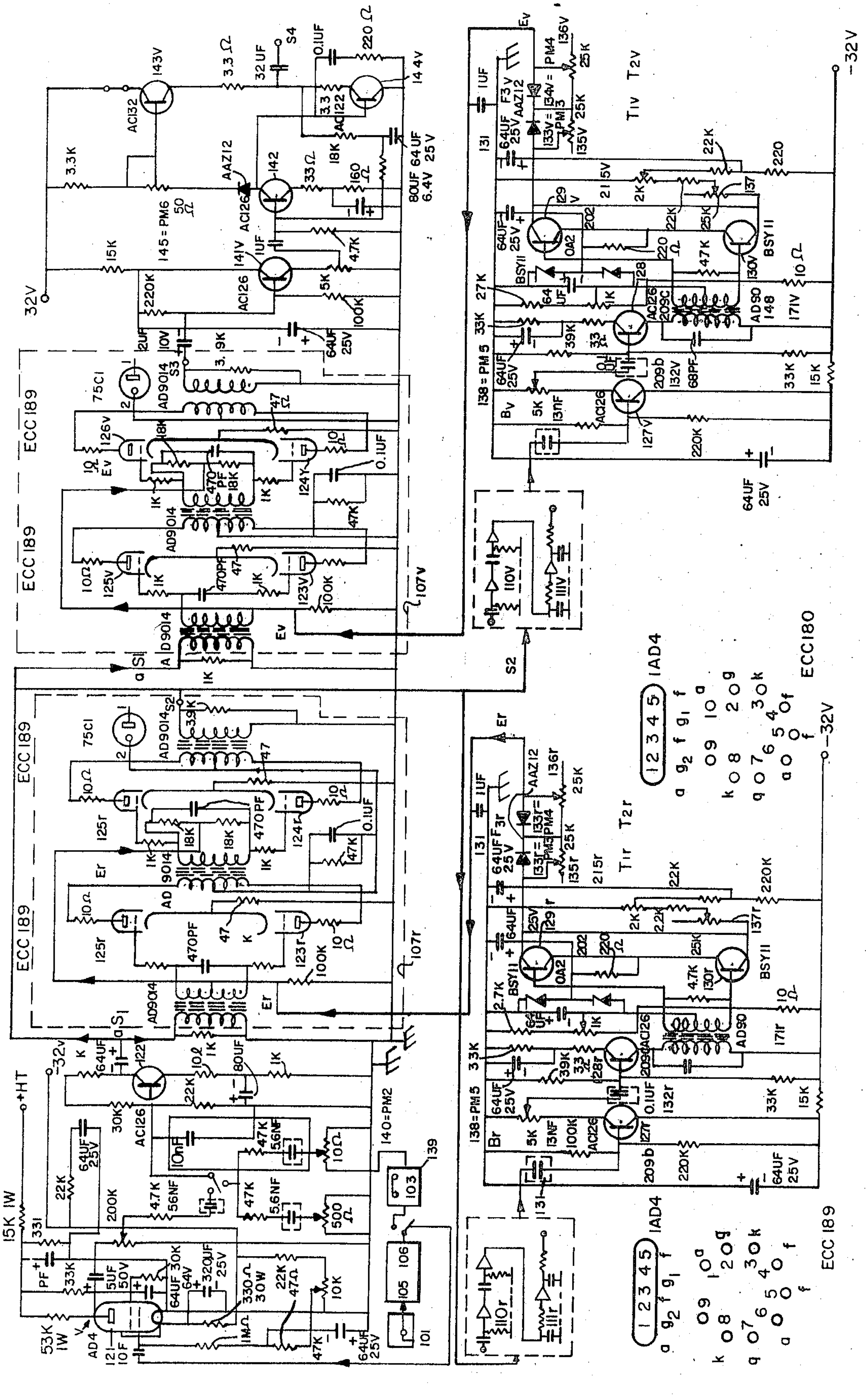
FIG. 3 is an electrical circuit diagram of the regulator depicted in FIG. 1, wherein the variable gains are obtained through the use of electronic tubes possessing variable slope characteristics.

FIG. 3 is an electrical circuit diagram of a double-loop compressor utilizing push-pull electronic tubes with variable slope characteristics.

The input signal $aS_1$ is derived from the microphone 101 or from the magnetophone 103 via the correction filter 105, 106 as well as two pre-amplifier stages with the high-ohm tube 121 and the transistor 122. The correction filter 105, 106 can possess suitable combinations of active high- and low-pass filters, as such are indicated at 110$r$, 111$r$.

The double-loop compressor contains two variable amplifiers, 107$r$ for reverse, 107$v$ for forward. The reverse amplifier 107$r$ contains four triode tubes 123$r$ to 126$r$ with variable slope characteristics connected in push-pull. Their gate voltages are controlled by an error signal $E_r$. This is derived from the intermediate signal $S_2$ via the loop filter with high-pass 110r and low-pass 111$r$ as well as via the four transistors 127$r$ to 130$r$.

The mode of operation of the loop filters 110r, 111$r$ is supplemented by the capacitors 131, 132, and the transformer 171 which attenuates frequencies beneath 800 Hz with 10 dB/octave. The loop rectifier which is quadratic ($r = 2$) is incorporated in the transistors 129$r$, 130$r$. The low-pass filter $F_{3r}$ and the phase shifter contain the capacitor 131r, the two potentiometers 135$r$, 136$r$ and two diodes 133$r$, 134$r$, by means of which it is possible to separately adjust, according to the invention, the build-up and decay time constants $T_{1r}$ and $T_{2r}$. In this way it is possible to optimumly express the build-up and decaying operations. The diode 133$r$ in particular allows enlarging the build-up time constant $T_{1r}$ in such a manner that, for instance, the so-called explosive phonemes such as P,T,K,B,D,G, can be differentiated from the others. This discrimination can be particularly advantageous for speech recognition equipment as well as for telephone- or hearing aid devices.

The loop amplification $B_r$ is adjusted by the potentiometer 138$r$. The maximum gain or amplification of the amplifier 107$r$ is adjusted by the potentiometer 137$r$.

The second amplifier 107$v$ contains similar components as the amplifier 107$r$, yet its loop chain operates in the forward direction instead of in the reverse direction. This has been indicated by the letter "$v$" which appears in place of the letter "$r$" at the end of the same reference numerals or characters.

The output signals $S_2$ of the amplifier 107$r$ becomes the input signal in the loop chain "$v$" of the amplifier 107$v$, via the loop filter "$v$" with high-pass 110$v$ and low-pass 111$v$.

Therefore, in principle the output signal $S_3$ from the amplifier 107$v$ follows the Equations developed in conjunction with FIG. 1 and graphically depicted in FIG. 2. This output signal $S_3$ can then be further amplified by the terminal amplifier possessing the transistors 141v to 144v until obtaining the output signal $S_4$.

Figure 4:
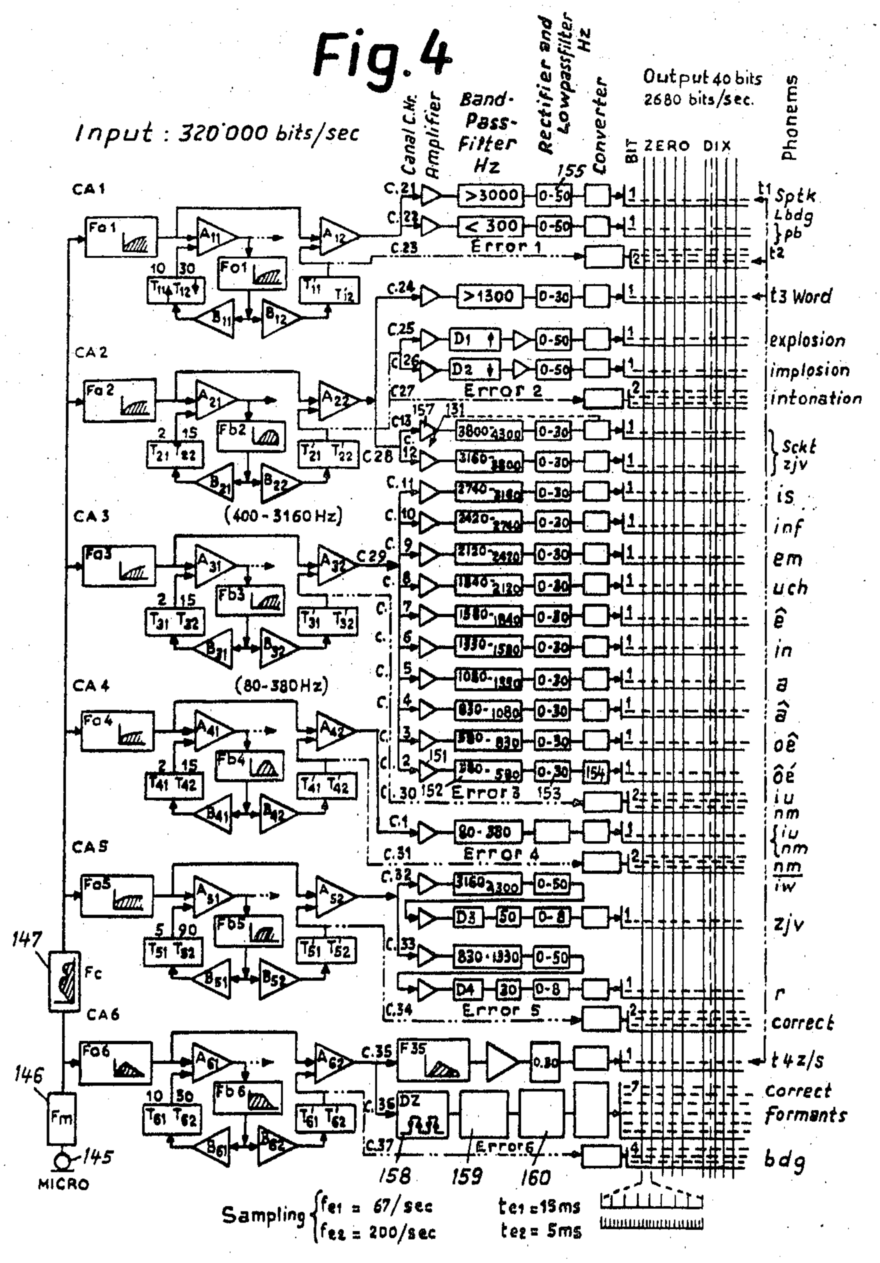
FIG. 4 is a schematic diagram of a phonetic and melodic information extractor utilizing six amplitude regulators of the type shown in FIG. 1.

FIG. 4 illustrates the electrical schematic diagram of a speech- and melody-extractor or indicator, which for instance advantageously can use a number of double-loop regulators.

The signals delivered by the microphone 145 are spectrally equalized by the correction filters 146, 147. The filter 147 consists of a band-pass 500 Hz to 6,000 Hz with a band-stop, centered at about 1,300 Hz, whereby the excessively intense or strong components of speech sounds made with the mouth open (A, AE, and so forth) are accommodated on the average to the other components.

The spectrally equalized signals distribute themselves at six double-loop amplitude compressors CA1 to CA6, with the six input filters Fa1 to Fa6. The compressors CA1 to CA6 contain six variable amplifiers $A_{11}$ to $A_{61}$ with reverse or feedback loops and six variable amplifiers $A_{12}$ to $A_{62}$ with forward loops. They feed the following 26 channels:

13 channels C1 to C13 for quasi-stationary spectral analysis (formants).

2 channels C21, C22 for discrimination of the build-up operation of the explosive sounds or syllables.

3 channels C24 to C26 for general energy envelopes and their steepness or slope.

2 channels C32, C33 for fluctuations (so-called fricative sounds) and rolling r-sounds, sub-formants.

2 channels C35, C36 for extraction of the vocalization and the pitch (fundamental sounds).

6 channels C23, C27, C30, C31, C34, C37 for the error signals (dynamic indication).

The described parameters are accommodated to the desired functions: one is particularly concerned with the input filters Fa1 to Fa6, the loop filters Fb1 to Fb6, the reverse loop gains $B_{11}$ to $B_{61}$, the forward loop gains or amplifications $B_{12}$ to $B_{61}$, as well as the build-up and decaying time-constants $T_{11}$ to $T_{16}$ and $T_{12}$ to $T_{62}$, and $T'_{11}$ to $T'_{16}$ and $T'_{12}$ to $T'_{62}$, with regard to the error signals.

The following chart or table provides a number of examples of numerical values for these parameters.

CHART

| Compressor | | | Boundary frequencies (Hz) and slopes (dB/octave) of the input filter (a) and the loop filter (b) | | | | Time constant of the error or deviation signal | |
|---|---|---|---|---|---|---|---|---|
| Position | Function | Position filter | High-pass Hz | dB Octave | Low-pass Hz | dB Octave | $T_{11}$ ms | $T_{12}$ ms |
| CA1 | Build-up | Fa1 | 400 | 6 | — | — | — | — |
| | (explosive) | Fb1 | 750 | 6 | — | — | 10 | 30 |
| CA2 | Envelope | | | | | | | |
| | + slope | Fa2 | 400 | 6 | — | — | — | — |
| | + channel 12,13 | Fb2 | 500 | 24 | 2,900 | 24 | 1 | 20 |
| CA3 | Spectrum II | Fa3 | 400 | 6 | — | — | — | — |
| | channel 2, 11 | Fb3 | 500 | 24 | 6,000 | 24 | 1 | 20 |
| CA4 | Spectrum I | Fa4 | 200 | 6 | — | — | — | — |
| | channel 1 | Fb4 | 500 | 24 | 1,600 | 24 | 2 | 20 |
| CA5 | Fluctuat- | Fa5 | 500 | 6 | — | — | — | — |
| | ions | Fb5 | 800 | 6 | — | — | 5 | 100 |
| | Rolling | | | | | | | |
| CA6 | Vocaliz- | | | | | | | |
| | ation | Fa6 | 100 | 24 | 120 | 24 | — | — |
| | Melody | Fb6 | 650 | 6 | — | — | 4 | 30 |

A channel such as C2 for spectrum analysis contains, for instance, a linear amplifier 151, a band-pass 152 (380 Hz to 580 Hz), a rectifier with low-pass filter 153 (0 to 30 Hz, 30 dB/octave), the time-constant of which determines the time window, and an analogue-digital converter with multiplexer 154.

With large build-up time-constant $T_{11}$ (for instance 10 ms for loop filter Fb1 of CA1) and corresponding time-constant of the low-pass filter 155 (0–50 Hz, at the end of the channel C21 there appears an overshoot-oscillation which may be characteristic for an explosive sound.

The sampling frequency is chosen in this case to be 200 Hz for instance, instead of 50 Hz for the quasi-stationary amplitudes, whereby there is obtained an increased saving in the quantity of information to be processed.

The analogue-digital converter can be a simple trigger in the case where two peak values 0 and 1 are satisfactory, corresponding to 1 bit. The phonemes given to the complete right of the column are differentiated by the digital peak. The boundary frequencies are given for instance for the diverse band-filters (critical band width) and low-pass in FIG. 4. The peak-differencies between the error signals from the channels C30 and C31 allow, for instance, differentiation of the class of vowels *i, u*, from the class of consonants *n,m*.

The channels C25 and C26 extract the ascending and descending slopes of the error signal from the channel C27 with the aid of the differential circuit $D_1$, $D_2$.

The input amplifier 157 of the channel C13 can be retroactively adjusted by the digital output in accordance with the arrow 131.

The channels C32, C33 extract the fluctuations of the fricative sounds *z, j, v*, and the rolling of *r*-consonants with the aid of the band-passes 3160–4300 and 830–1330, as well as the differential circuit $D_3$, $D_4$.

The compressor CA6 delivers at the input of the channel C35, C36 the self-regulated amplitude of the fundamental frequency which is freed of the higher frequency components by the low-pass portion of the input filter Fa6. This fundamental frequency can be, for instance the speech fundamental tone between 70 and 600 Hz. One is then concerned with a pitch extractor or melograph.

The channel C35 delivers binary information "yes-no" concerning the presence of vocalization. The channel C36 contains a zero detector 157, a logic system 158 and a compensated counter 159. It delivers for instance, the melody in digital form with 128 one-sixth tones (7 bits) which distribute themselves over 3 octaves, between 70 and 560 Hz. With 8 bits one obtains 256 one-twelth tones, and so forth. With 1 to 3 bits the melody range is divided into 2 to 8 sections, corresponding to the voices of men, women and children. A digital-analogue converter enables an oscillograph to plot the melody curve as a function of time.

The melograph will be described in detail in conjunction with FIG. 13.

The digital output of the diverse channels can be sampled with frequencies $f_{e1}$ or time intervals $t_{e1}$ which are different, depending upon whether one is dealing with quasi-stationary or transitory signals. For instance, $F_{e1} = 50$ Hz or $t_{e1} = 20$ ms for the one signal and $f_{e2} =$ 200 Hz or $t_{e2} = 5$ ms for the other. Thus it is possible to measure the duration of the signals and the pauses as well as the relative time-intervals with the required accuracy.

If the "bits" which appear at the channel outputs are added then there is obtained 40 bits. While taking into account the scanning frequency the information flow becomes 2,680 bits/sec. The saving is therefore significant if one remembers the numbers for complete music-, speech- or telephone transmissions, which naemly amount to 320,000, 160,000 and 64,000 bits/sec.

The darkened fields or zones of a gate to the right of FIG. 4 approximately indicates the information units which represent the words "zero" and "dix."

The segmentation of the phonemes and the discrimination of the explosive sounds can take place if there is taken into account the times $t_1$ to $t_4$ where the information units appear and disappear in the diverse channels. The explosions and vocalizations as well as their relative time spacings, which can appear in the channels C21, C23, C24, C27, then C35 to C37 are depicted in detail in FIGS. 11 and 12.

Figure 5:
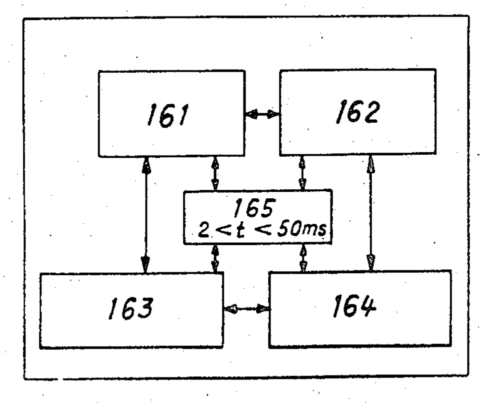
FIG. 5 is a block diagram of a phoneme-recognition matrix, which is the simplest form of logical means.

According to FIG. 5 the logical processing of the information components can be undertaken with the aid of a matrix which is sub-divided into 4 sub-matrixes, such as 161 for "drive and steepness," 162 for "envelope and spectrum", 163 for "fluctuations and rolling," 164 for "vocalization and pitch." These are coupled with one another by a further sub-matrix 165 "storage, duration, and time-interval." It is possible to provide a minimum duration of 40 ms for quasi-stationary signals and 2 to 50 ms for transitory signals.

Figure 6:
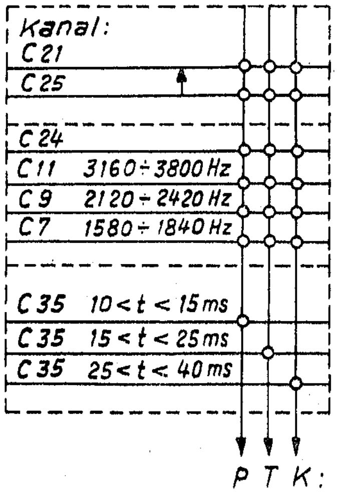
FIGS. 6 and 7 illustrate two components of the matrix of FIG. 5.

FIG. 6 illustrates how the connection between the channel outputs C21 (drive), C25 (slope or steepness), C24 (envelope), C11, C9, C7 (spectrum), C35 (vocalization) with three time intervals, 10–15, 15–25, 25–40 ms, permit discrimination of the explosive sounds P,T,K, (with subsequent vowels).

Figure 7:
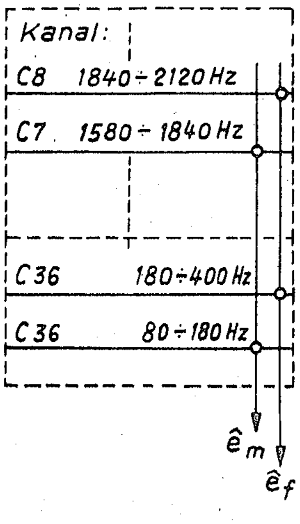

FIG. 7 illustrates the manner in which it is possible to correct the connections between the formant channels C8 and C7 by the channel C36, in accordance with a man's voice (80–180 Hz) or a woman's voice (180–400 Hz), in the case of the vowel "e." Finer corrections are also possible by using the pitch extractor.

The triode tubes possessing variable slope characteristics of FIG. 3 could be replaced by pentodes, or also semiconductors, such as transistors, diodes, photodiodes, and so forth, or by other non-linear amplifiers or multipliers such as Hall generators, varistors and so forth.

With the present state of the art field-effect transistors appear to be advantageous if they can be used as symmetrical variable resistors beneath the "pinch" regions.

Figure 8:
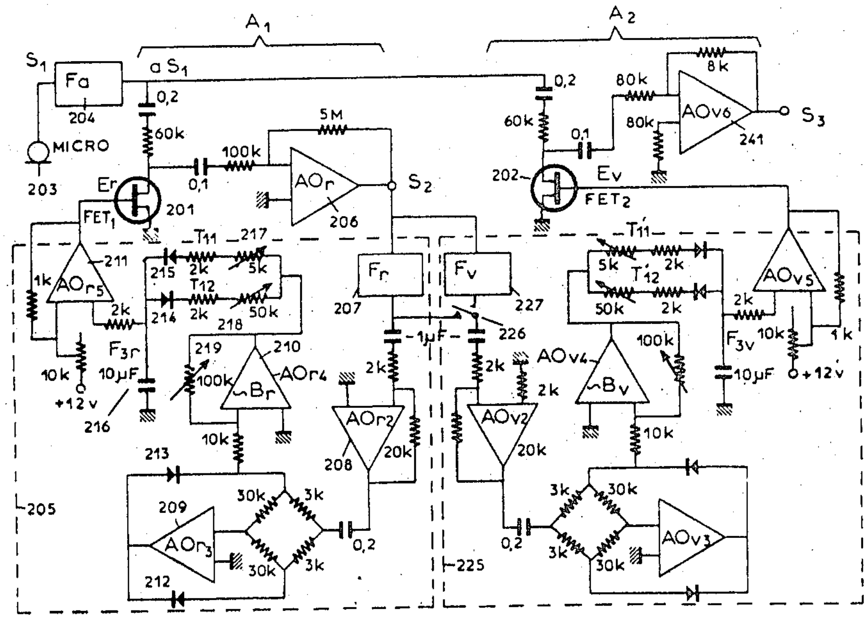
FIG. 8 is an electrical circuit diagram of double loop regulators similar to those of FIG. 3, whereby however the variable slope of electronic tubes is replaced by the variable resistance of field-effect transistors.

The electric schematic diagram of FIG. 8 illustrates a single- and double-loop compressor using two field-effect transistors 201 and 202, which form two amplifiers $A_1$ and $A_2$ with variable gain.

The microphone 203 supplies the two transistors 201, 202 parallel via the input filter 204 which delivers the signal $aS_1$.

The reverse loop chain contains the functional or operation amplifier ($AO_r$) 206, the loop filter ($F_r$) 207, the functional amplifier ($AO_{r2}$ to $AO_{r5}$) 208 to 211, the two-way rectifier diodes 212, 213 and further the two diodes 214, 215 which with the help of the smoothing capacitor 216 and the potentiometer 217, 218 allows separate adjustment of the build-up and decaying time-constants $T_{1r}$, $T_{2r}$.

The amplification or gain obtained by means of the amplifier 210 or amplifier 208 can be proportional to the loop gain $B_r$, and adjusted by the potentiometer 219.

The output signal $S_2$ of the reverse amplifier $A_1$ supplies the forward loop chain 225 of the amplifier $A_2$ via the loop filter ($F_v$) 227. This can be replaced by the filter ($F_r$) 207 when the switch 226 is located in the illustrated position 1.

All elements of the reverse loop chain are again located in the forward loop chain, thus for instance functional amplifiers $AO_{v2}$ to $AO_{v5}$.

The forward error signal is $E_v$. The output signal $S_3$ of the double-loop compressor is delivered by the functional amplifier ($AO_{v6}$) 241.

The regulator with variable resistances is more economical than that with variable slope, since push-pull circuits, which double the different components, are not absolutely necessary.

The circuit of FIG. 8 can be further simplified if a number of the functional amplifiers are omitted or replaced by simple transistors. Furthermore, the diverse components can be assembled or combined in integrated circuits.

Figure 16:
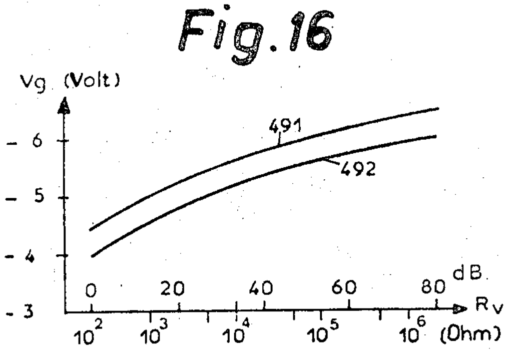
FIG. 16 illustrates the resistance curves of field-effect transistors as a function of gate voltage.
Figure 17:
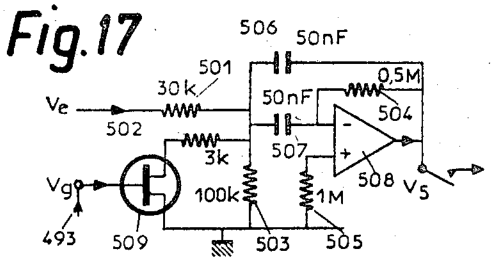
FIG. 17 is an electric circuit diagram of a band-pass filter, the boundaries of which can be automatically regulated by the resistance changes of a field-effect transistor, this band-pass filter being usable in the information extractor of FIG. 4, or in the melograph of FIG. 13.

It is desirable for both field-effect transistors 201 and 202 to exhibit characteristic curves which are similar or at least parallel (see FIG. 16).

Figure 9:
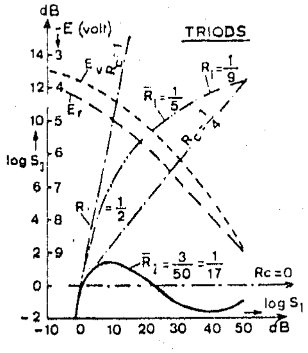
FIGS. 9 and 10 illustrate the regulation curves corresponding to the regulator of FIG. 3 and FIG. 8 respectively.
Figure 10:
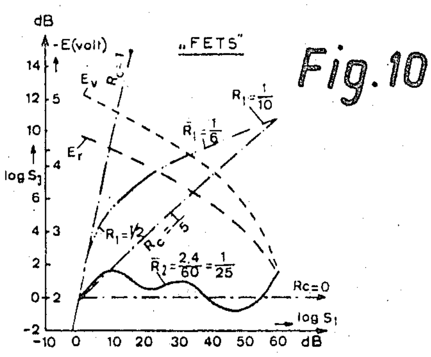

FIGS. 9 and 10 compare the average regulation $\overline{R}_2$ of double-loop compressors, which, on the one hand, is achieved with triodes according to FIG. 3 and, on the other hand, with fieldeffect transistors according to FIG. 8.

The vertical scale of the output peak, log $S_3$ (dB), is enlarged five-fold relative to the horizontal scale of the input peak log $S_1$ (dB), for purposes of clarity. For purposes of comparison there has also been illustrated the average regulation $\overline{R}_1$ which can be achieved with simple reverse loops. The regulations $R_1$ are very variable and there must be introduced an average regulation, for instance $\overline{R}_1$ = 1/5, varying from ½ to 1/9, or $\overline{R}_1$ = 1/6, varying from ½ to 1/10 according to the dash-dot curves. The straight lines $R_c$ represent theoretical constant regulations. The broken curves represent the error values $E_v$ and $E_r$ (volt).

The full line curves $\overline{R}_2$ illustrate that double-loop cmopressors can permit quasi-ideal and quasi-total regulations. In this case, for instace, the output peak varies up to ± 1.5 dB whereas the input peak varies up to 60 dB, corresponding to a regulation $\overline{R}_2$ = 1/20.

If a digital threshold, such as a trigger, is set at the peak "null" then the undesired signals can be shifted to the not yet regulated starting portion of the curve $\overline{R}_2$ between −10 and 0 dB. Thus it is possible to improve the signal-to-noise ratio.

Figure 11:
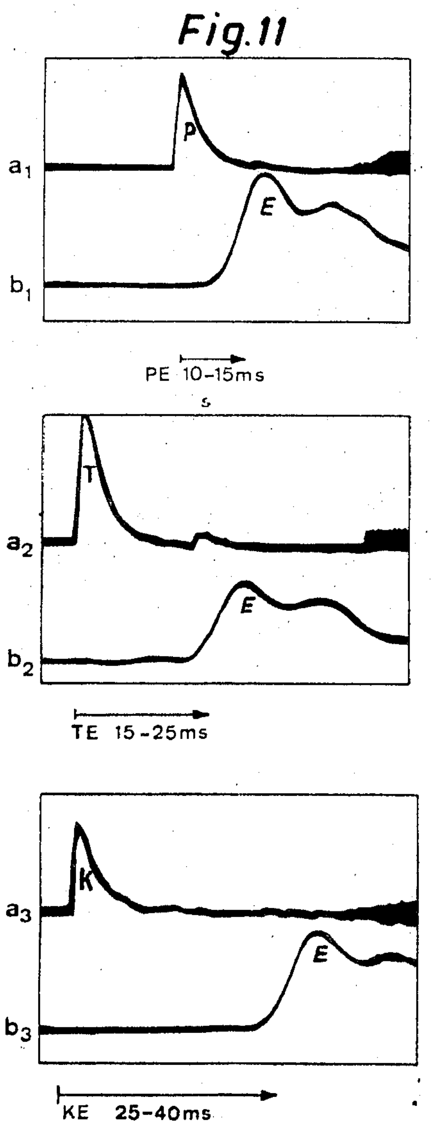
FIGS. 11 and 12 illustrate the oscillograms of regulated electrical signals which permit differentiation between diverse syllables, such as PE, TE, KE, PA, TA, KA.

FIG. 11 illustrates the time-interval between consonantinsertion (curves *a*) and vowel-inserion (curves *b*) for the syllables PE, TE, KE, as such appear at the output of the channels C21 and C35 of FIG. 4.

Figure 12:
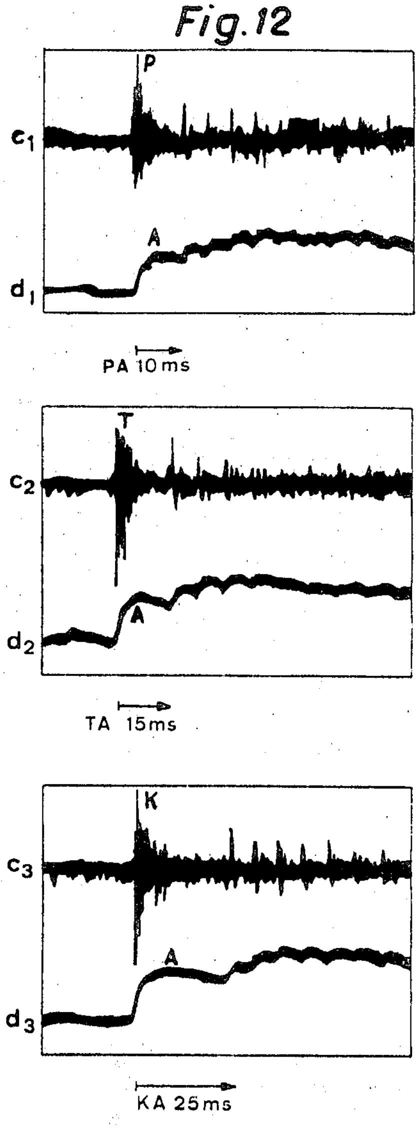

FIG. 12 illustrates the oscillograph of the regulated signal (curve *c* at the input of the channel C24) as well as the error signal (curve d at the start of the channel 27) for the syllables PA, TA, KA. Dynamic analysis can be undertaken separately from frequency analysis.

Figure 13:
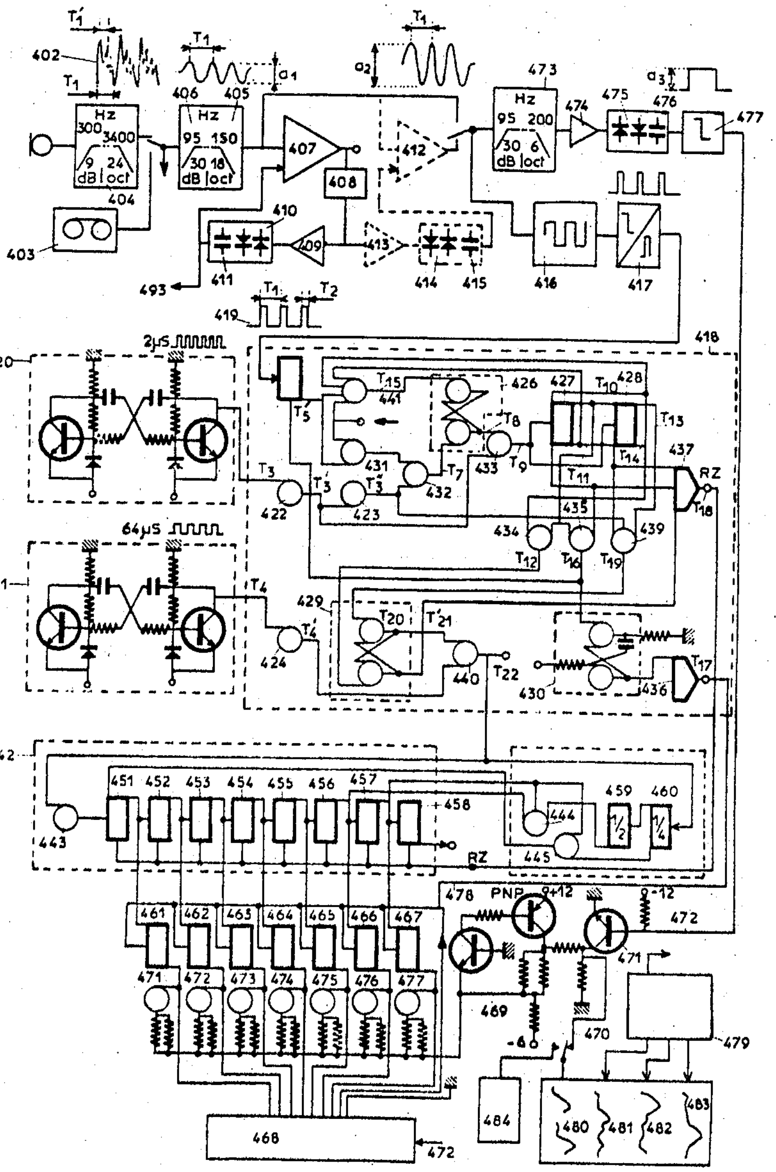
FIG. 13 illustrates the electrical circuit diagram of a melody extractor (melograph) based upon a single loop- or double loop-regulator according to FIG. 1, and which delivers the fundamental sound in analogue or digital form, and in objective or in subjective manner (Hertz, musical scale, or "mels" for instance)

According to the schematic diagram of FIG. 13 the microphone 401 delivers an electrical signal corresponding to a sound wave. This can represent speech, music or noise. The signal 402 can possess a fundamental frequency with the period $T_1$ (sec) and higher frequencies, or harmonics, with shorter periods $T'_1$ (sec). The signal 402 can also be derived from a magnetophone 403 or from a telephone line simulated by the filter 404. This can be split-up in a high-pass at 300 Hz (9 dB/octave) and in a low-pass at 3,400 Hz (24 dB/octave).

According to the present invention the signal is filtered by a low-pass filter 405 (for instance 150 Hz or 100 Hz with 18 or 24 dB/octave), which attenuates the higher frequencies and possibly also through a high-pass (for instance 90 Hz with 30 dB/octave), in order to reduce network disturbances at 50 Hz or 60 Hz.

The fundamental frequency to be extracted can vary between 70 Hz and 600 Hz for speech, corresponding to a period $T_1$ between 14.3 and 1.67 ms. An amplitude compressor with at least one variable amplifier 407 with a reverse loop regenerates the base or fundamental amplitude $a_1$. This loop contains a band-pass 408 (for instance 80 Hz to 600 Hz), a double rectifier 410 and a low-pass 411 (for instance 0–36 Hz).

It is possible to construct a double-loop compressor in that there is added the amplifier 412 with the forward loop 413 to 415. As a result, the fundamental frequency amplitude remains almost constant notwithstanding great frequency fluctuations.

The null detector 416 as well as the monostable flip-flop circuit 417 delivers to the input of the logical system 418 calibrated pulses 419, the duration or period being $T_2$ (20 microseconds) and which follow one another in the rhythm of the fundamental frequencies $T_1$ (14.3 to 1.67 ms).

Figure 14:
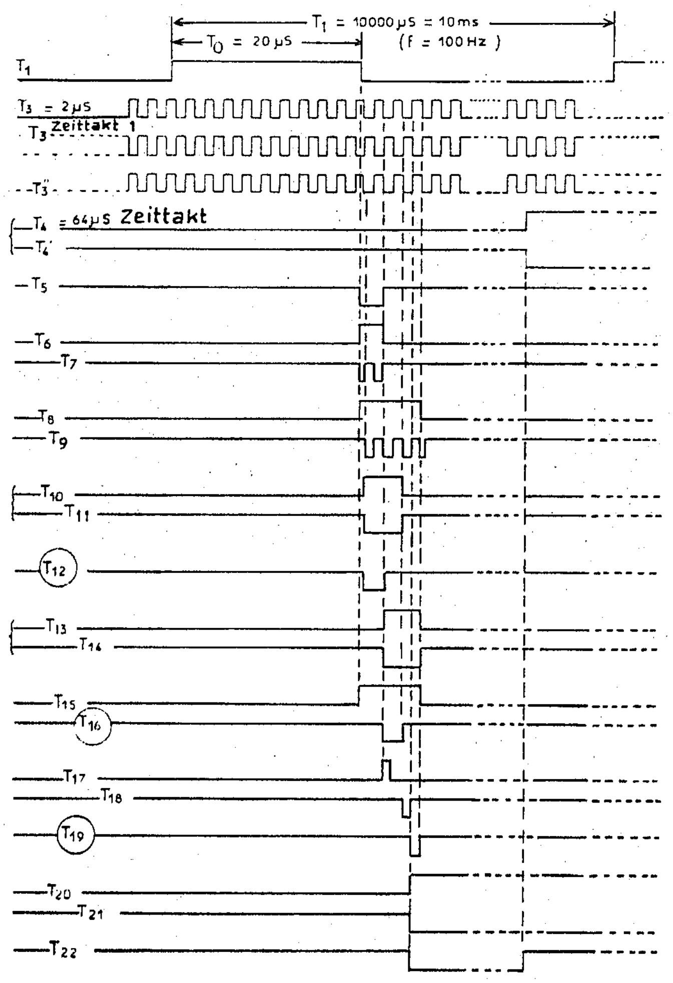
FIG. 14 is a time diagram of the pulses corresponding to the circuitry of FIG. 13.

A rapid timer 420 ($T_3$ = 2 microseconds) and a slow timer 421 ($T_4$ = 64 microseconds) deliver pulses via the gates 422 to 424, the times $T'_3$, $T''_3$, $T'_4$ have been indicated in FIG. 14.

The logical system contains the flip-flop circuits 425 to 430 and the gates 431 to 441 which deliver the pulses at the times $T_5$, $T_{22}$.

The counter 442 contains the eight flip-flop circuits 451 to 458 and the gates 443 to 445. The flip-flop circuit 459 divides the counting time by 2 and 4. The storage means 461 to 467 delivers the digital information 468 with seven bits, or the analogue information at 469, 470 with the aid of the digital-analogue converter 471 to 477.

The interrupting gate 471 only passes the analogue voltage if there has been indicated the presence of a fundamental frequency at 472. In order to eliminate a false fundamental frequency, which for instance can be simulated by noise, the amplitude $a_3$ delivers a "yes-no" information at the end of the following chain: band-pass 473 (95 Hz to 200 Hz), amplifier 474, rectifier 475, low-pass 476, trigger 477.

An electronic computer can further process the results of the 7 bits at 468, of the "yes-no" voltage at 472, and of the transfer command 478.

Thus there is selectively obtained the numerical values of the fundamental frequency, or their variations, or the curves plotted by oscillograph 479. Such can be coupled with a spectrum analyzer and possess a number of tracks, such as 480 for the fundamental frequency, 481 for the total energy, 482 and 483 for frequency components, such as formants. A generator can deliver constant frequencies for etching.

Figure 15:
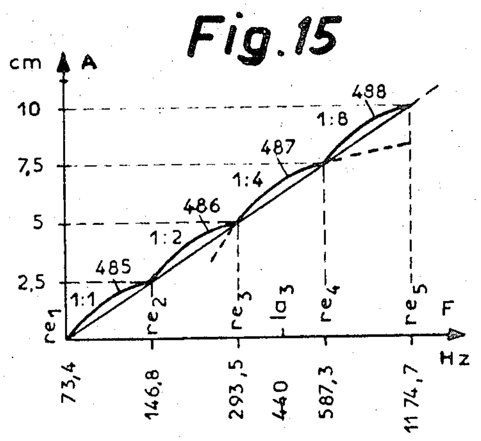
FIG. 15 graphically illustrates a musical scale delivered by the melograph of FIG. 13.

FIG. 15 illustrates the musical scale delivered by the described fundamental frequency extractor over 3 octaves, from 73.4 Hz to 587.3 Hz. One can observe a sequence of three curved sections 485 to 487, which correspond to the ratios or divisions 1:1, 1:2, 1:4 through the counter means 451 to 460. Therefore, one approaches the logarithmic straight line corresponding to the properly tuned piano, with 440 Hz as the normal frequency. In order to embrace the entire range of a song it would be necessary to add after the curve 488 the fourth octave, up to 1174.7 Hz, with the aid of a further division 1:8. It would also be possible to approach the logarithmic straight line by diode systems for instance.

Furthermore it is possible to represent a subjective "Mel"- scale if one approaches a power function with the exponent 1/4.5, instead of a logarithmic function.

FIG. 16 illustrates the characteristic curves of field-effect transistors suitable for double-loop compressors. Both curves 491, 492 should extend as congruent as possible, or at least parallel, whereby compensation can take place by polarization.

It can be advantageous to replace the fixed band-pass 405, 406 or 473 of FIG. 13 by a band-pass with variable boundary limits according to FIG. 15. This filter possesses the fixed resistors 501 to 505, the capacitors 506 and 507, the functional amplifier 508 and the field-effect transistor 509 which forms a variable resistor as a function of the gate voltage $V_g$. Thus it is possible to control the gate voltage $V_g$ by an error voltage 493 of an amplitude regulator.

Figure 18:
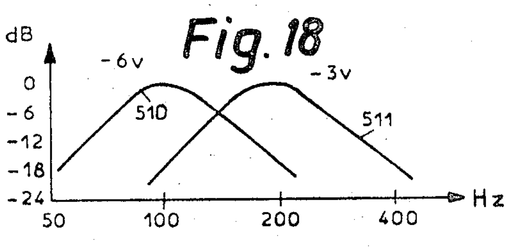
FIG. 18 graphically illustrates the curves associated with the band-pass filter of FIG. 17.

According to FIG. 18 the curve 510 (at 100 Hz) displaces towards the curve 511 when the fundamental frequency increases, that is, when the absolute value of the error voltage decreases (from –6 volts to –3 volts).

Under these conditions the filter follows the fundamental frequencies, the extraction of which is thereby improved, especially if it extends over a wide range, for instance over 3 to 4 octaves.

Figures 19, 20, 21, 22:
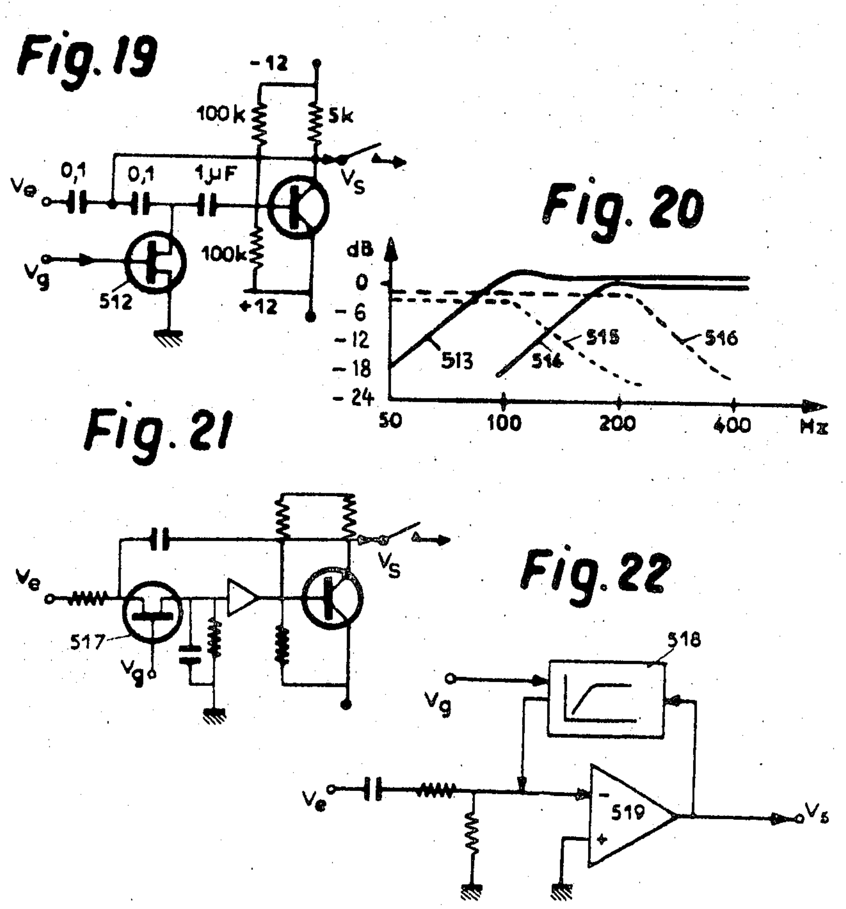
FIG. 19 is an electric circuit diagram of a high-pass filter, the boundaries of which can be varied by a field-effect transistor.
FIG. 20 graphically illustrates the characteristic curves associated with the high-pass filter of FIG. 19.
FIGS. 21 and 22 are respective circuit diagrams of low-pass filters, the boundary limits of which can be varied by field-effect transistors.

FIG. 19 illustrates an analogous schematic diagram for a high-pass, with the variable resistors, which is suppled by the field-effect transistor 512. According to FIG. 20 the boundary can be displaced from curve 513 to curve 514.

FIG. 21 illustrates a low-pass the boundary of which shifts from curve 515 to curve 516 because of the variable resistor 517. If desired a high-pass, similar to that of FIG. 19, can be situated in the feedback loop 518 of the functional amplifier 519, so that there is obtained a low-pass, the boundary of which is controlled by a gate voltage $V_g$.

Figure 23:
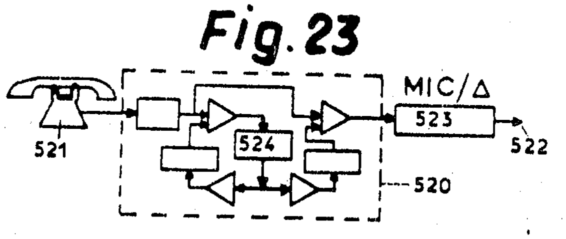
FIGS. 23 and 24 schematically show the use of the inventive amplitude regulators in telephone equipment as well as hearing aid equipment, respectively.
Figure 24:
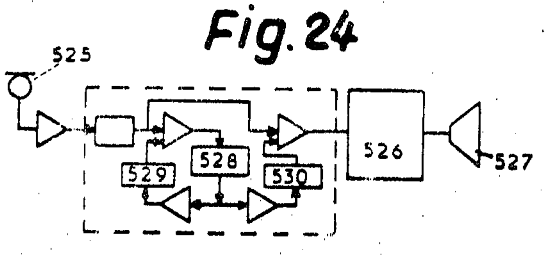

According to FIG. 23 it is possible to insert a double-loop regulator between a telephone apparatus 521 and a transmission line 522. The signals can be coded, for instance by a PCM (pulse-code-modulated) or Delta-system. There thus results an improvement in comprehensibility, or a reduction in the number of required bits/second. In particular, a loop filter 524, which attenuates the higher frequencies (for instance above 1,600 or 2,500 Hz or below 400 Hz), whereby these frequencies appear amplified during transmission, to thereby improve comprehensibility.

Figures 25A, 25B:
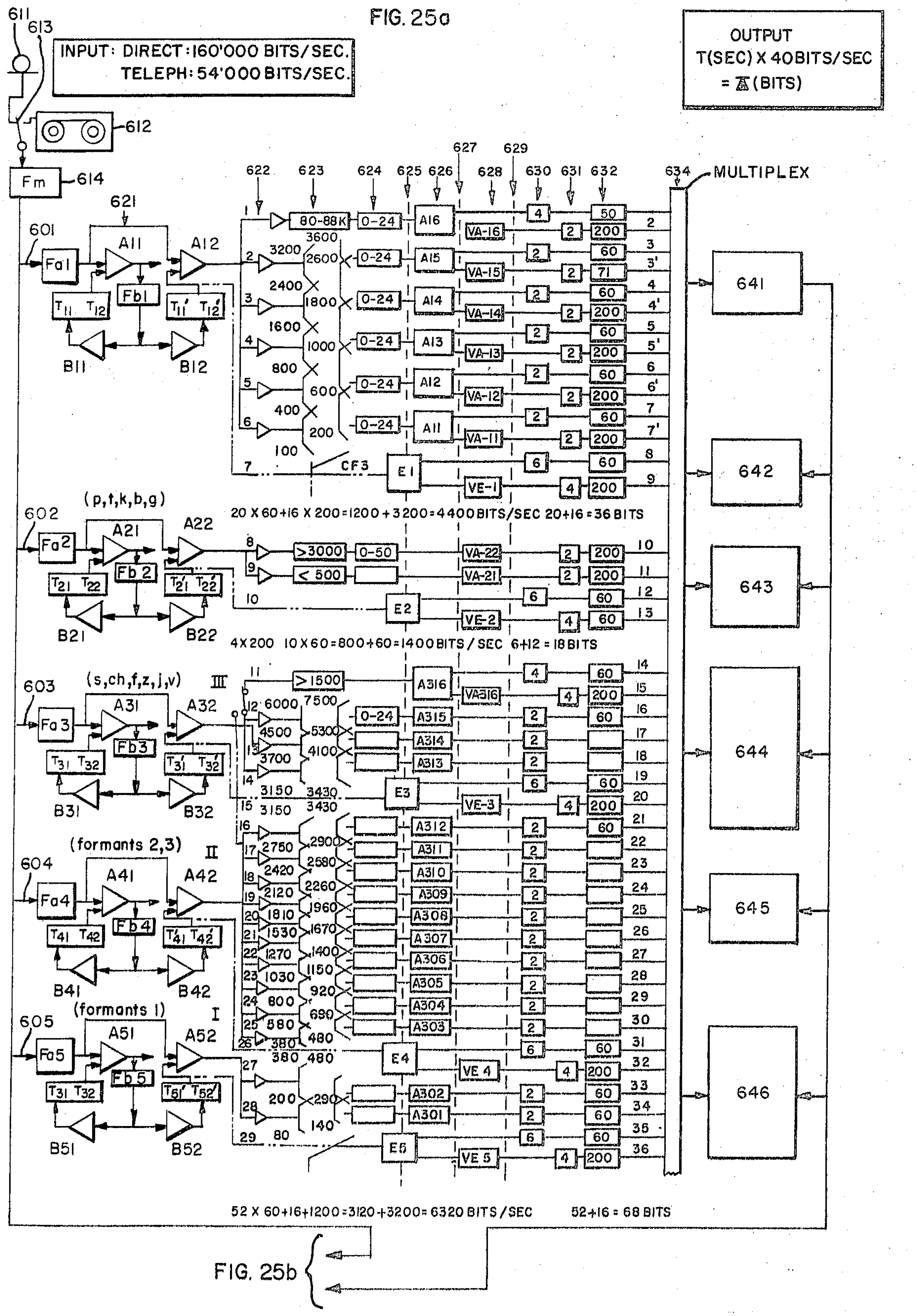
FIGS. 25*a* and 25*b* collectively depict a General Electric circuit diagram of a voice-information extractor (or voice indicator, or voicograph).
Figure 25B:
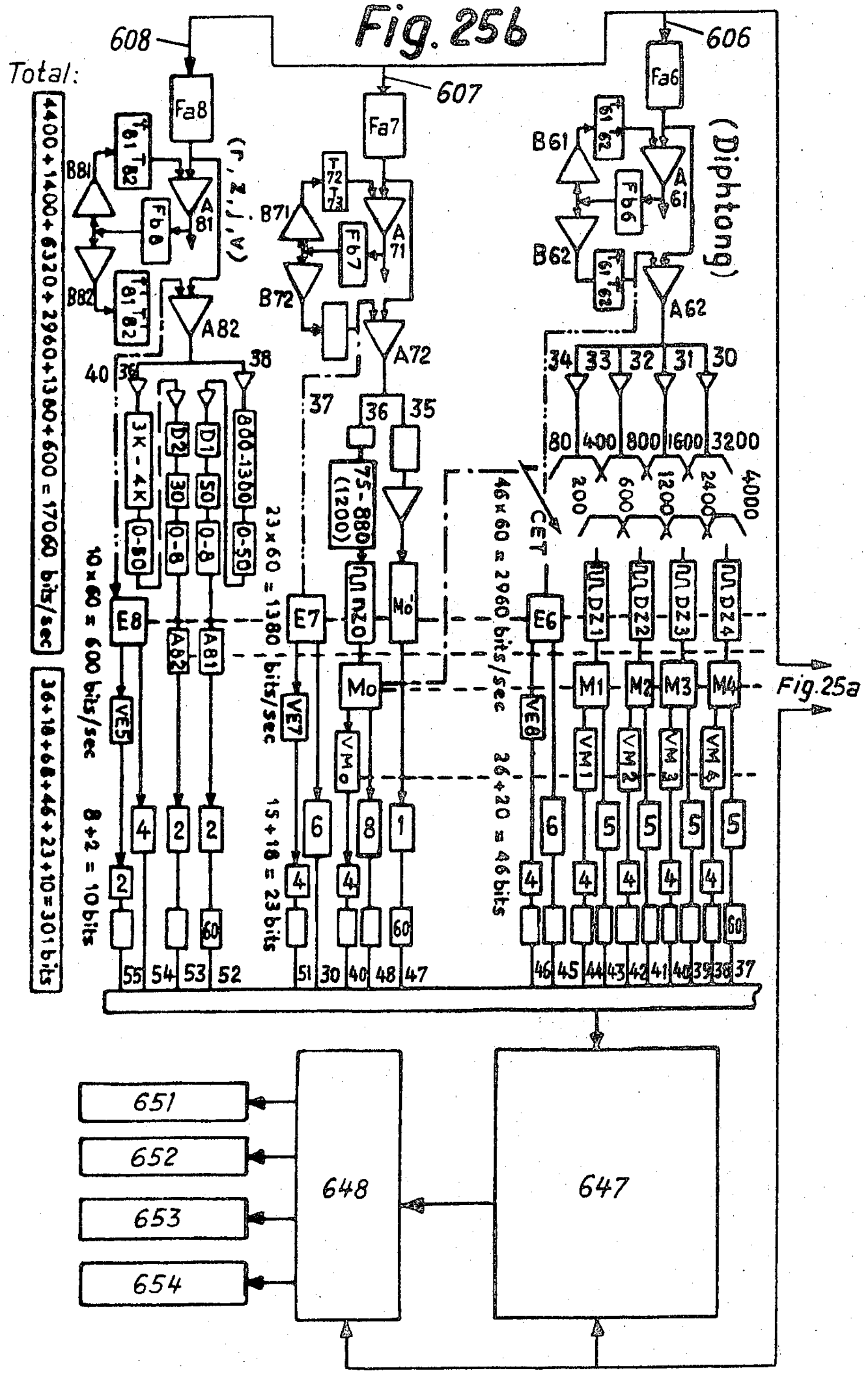

According to FIGS. 25*a* and 25*b* a single or double loop regulator may be inserted between a microphone 525 and a hearing aid apparatus 526 feeding the earphone or the loudspeaker 527. According to the chosen filtering by loop filter 528 and to the time constants in the low-passes 529, 530, the hearing aid apparatus may be adapted exactly to the auditory curves of the users. It is also possible to reinforce at will the hearing of certain important phonemes like explosive or fricative consonants of which the action or energy is very weak.

Generally speaking an inventive amplitude regulator allows control of physical action (=energy *x* with time) as well as physiological effects of the signals. It is recalled that energy is proportional to the squared amplitude. According to the loop filtering and to the associate time constant it is possible to equalize or to differentiate at will the physical actions of signals delivered at the output of the regulator.

It would be advantageous to combine in the same integrated circuit the various elements of a double loop regulator together with other elements like a microphone constituted by a semiconductor. Extreme miniaturization would be combined with better security.

FIGS. 25*a* and 25*b* show the general circuit diagram of a voice information extractor or "vocograph" using a double loop regulator pitch extractor and filters with variable boundaries, as previously described. The information capacity of the human voice is in the order of 160,000 bits/second, while the conscious memory can only accept 40 bits/second. In consequence the "vocograph" has to extract pieces of 40 bits/second from the mass of 160,000 bits/second.

The eight double loop regulators with inputs 601 to 608 in the column 621 allow to make the output levels independent of the input levels and to separate dynamic analysis from spectrum analysis.

The signals which are captured by microphone 611 or by magnetophone 612 are directed by the switch 613 and corrected by the input filters 614 ($F_m$) and $F_{a1}$ to $F_{a8}$, of column 621. Afterwards the signals distribute among the eight regulators with inputs 601 to 608. Each of these regulators has adjustable parameters like direct gains $A_{11}$, $A_{12}$, loop filters $F_{b1}$, loop gains $B_{11}$, $B_{12}$, build-up- and dying-out constants $T_{11}$, $T'_{11}$, and $T_{12}$, $T'_{12}$.

The regulators feed the input of the following 40 channels in column 622:

- 7 channels 1 to 7 for dynamic analysis (signal to noise ratio, slopes, etc.).
- 3 channels 8 to 10 for analysis of initial transcients (explosive consonants, etc.).
- 19 channels 11 to 29 for quasi-stationary spectrum analysis (formants, etc.).
- 5 channels 30 to 34 for transitory spectral analysis with zero detectors DZ1 to DZ4 (diphthongs, etc.).
- 3 channels 35, 50, 37 for vocalization and melody with zero detector DZO (pitch extractor or melograph, etc.).
- 3 channels 38 to 40 for the analysis of rolling and fluctuating phonemes (*r, z, j, v*, . . . ).

These various signals are handled by band-passes (column 623), rectifiers and low-passes (column 624), detectors for time variations (column 628), concerning the error levels (column 625), the amplitudes (column 626), the tones (column 627), and their time derivatives (columns 628, 629).

The analyzers deliver levels (dB) corresponding to physical actions (energy *x* time), pitch heights (Hz), as well as the speeds of level variations (dB/second) and of pitch heights (Hz/second), which characterize the necessary information.

The analogue-digital convertors (columns 630, 631) quantify the selective signals and deliver 1 to 8 bits per channel. These are sampled (column 632) at frequencies between50 and 200 Hertz giving the outputs 1 to 55 (column 633). The multiplexing (column 643) allows to introduce these data into the logic system 641 (computer, memories, recognition, matrixes, measuring also the duration, the delays and inter-actions of signals).

The fundamental frequency (pitch) may control the spectrum analysis either over the line CF, modifying the boundary of the band-passes or in the logical part. For instance the line CF1, CF2 may displace the central frequency of channel 19 (column 623) from 1,810 Hz to 1,960 Hz.

Generally speaking most of the analogue functions may be simulated by the computer.

The complete analyzing system delivers an information quantity of 301 bits and information capacity of 17,060 bits/second. This number is much smaller than the 160,000 bits/second presented at the input. Nevertheless it still contains a strong redundancy in order to reduce the errors by a succession of probabilistic decisions.

This number does not appear to be very much smaller than the 54,000 bits/second coming over telephone lines. Nevertheless, the two numbers are not comparable because they are issued from different frequency bands: the extraction of vocal information from the telephone band necessitates transpositions in order to compensate the absence of frequencies over 3,600 Hertz and other missing elements.

The analyzers and the logical system may finally deliver graphical drawings or alpha-numerical symbols which are adapted to the conscious information capacity of 40 bits/second. Multiplying this number by $T$ (seconds) gives the required information $I$ (bits) = $T$ (seconds) × 40 (bit/second).

The output may be distributed over various apparatuses:

spectrograph 642 (visualization of frequency spectrums and of the dynamics).

pitch extractor 643 (visualization of the fundamental frequency and of its dynamics).

vocal analyzers 644 delivering objective measurements (dB, phones, tones, dB/second, phones/-second, tones/second) and subjective measurements (sones, mels, sones/seconds, mels/seconds).

individual recognition of persons 645 (individual characters).

phonetic actuator or phonactor 646 (remote control by limited vocabulary).

phonetographs 647 (visualization of phonemes with non-limited vocabulary).

The phonetograph may be associated with phonetic-orthographic translators 648, constituted by computers with specialized memories (commerce 651, law 652, techniques 653, medicine 654, etc.).

The logical system advantageously includes a sliding memory for two or three signal elements like phonemes. The decision concerning the recognition of one element depends on the recognition of the preceding or of the following or of both elements.

While there is shown and described present preferred embodiments of the invention, it is to be distinctly understood that the invention is not limited thereto but may be otherwise variously embodied and practiced within the scope of the following claims. Accordingly,

What is claimed is:

1. An amplitude regulator circuit in combination with communication systems and/or with devices reconising and/or recording image signals, speech signals, musical signals; said amplitude regulator circuit comprising an amplifier having an input and an output, the gain of which can be varied by a feedback loop chain in circuit with the amplifier embodying a loop amplifier, a rectifier and a low-pass filter, a steep low-pass filter means located in front of the input of said amplifier, in order to extract the fundamental frequency of said signals, wheresas the amplitude of the fundamental frequency of said signals is recovered by said circuit, a band-pass filter located at the input of said feedback loop chain in order to further select the fundamental frequency, the boundary frequency of said low-pass filter having a value chosen in a range between about 100 and 150 Hz with a damping between 18 and 30 dB/octave, said amplitude regulator circuit feeding two electrical signal circuits in parallel, one circuit including means for counting a zero-crossing of waves of the fundamental frequency, the other circuit embodying a band-pass filter and electronic switches which interrupt the pulses of the counting means going to a display in case of voiceless sounds.

2. An amplitude regulator circuit in combination with communication systems and/or with devices recognising and/or recording image signals, speech signals, musical signals; said amplitude regulator circuit comprising an amplifier having an input and an output, the gain of which can be varied by a feedback loop chain in circuit with the amplifier embodying a loop amplifier, a rectifier and a low-pass filter, a steep low-pass filter means located in front of the input of said amplifier, in order to extract the fundamental frequency of said signals, whereas the amplitude of the fundamental frequency of said signals is recovered by said circuit, a band-pass filter located at the input of said feedback loop chain in order to further select the fundamental frequency, the boundary frequency of said low-pass filter having a value chosen in a range between about 100 and 150 Hz with a damping between 18 and 30 dB/octave, at least an additional amplifier for higher frequencies connected parallel to the amplifier for the fundamental frequency, the output signal of said additional amplifier being fed to logic means through a band-pass filter and smoothing filter, and said logic means recognising the sound or the phoneme according to the time difference between the signals coming from the lowerand from the higher frequency components. lower and

3. An amplitude regulator circuit as defined in claim 2, wherein the loop signal arriving at the input of said amplifier goes through a line to said logic means for displaying the dynamics (level-variations) of the input signal.

4. An amplitude regulator circuit in combination with communication systems and/or with devices recognising and/or recording image signals, speech signals, musical signals; said amplitude regulator circuit comprising an amplifier having an input and an output, the gain of which can be varied by a feedback loop chain in circuit with the amplifier embodying a loop amplifier, a rectifier and a low-pass filter, a steep low-pass filter means located in front of the input of said amplifier, in order to extract the fundamental frequency of said signals, whereas the amplitude of the fundamental frequency of said signals is recovered by said circuit, a bandpass filter located at the input of said feedback loop chain in order to further select the fundamental frequency, the boundary frequency of said low-pass filter having a value chosen in a range between about 100 and 150 Hz with a damping between 18 and 30 dB/octave, an amplifier for the fundamental frequency and at least a further amplifier for higher frequencies connected in parallel at the input, the output signal of said fundamental frequency amplifier being received by a counter means counting the zero-crossing points of waves of the fundamental frequency, the further output signal being delivered to filter means of the specific frequency components and through smoothing filter means to separate inputs of said logic means, the connections in the logic means being adapted to change the higher frequency components of the signals relating to the variations of the fundamental frequency.

5. An amplitude regulator in combination with communication systems and/or with devices recognising and/or recording image signals, speech signals, musical signals; said amplitude regulator comprising an amplifier having an input, the gain of which can be varied by a feedback loop chain in circuit with said amplifier embodying a loop amplifier, a rectifier and a low-pass filter, said low-pass filter including a capacitor, further comprising an additional rectifier and a resistance connected between said low-pass filter and the input of said amplifier, said additional rectifier and resistance controlling a time-constant which depends upon the direction of current flow, in order to regulate the ascending slope of the loop signal independently from its descending slope and to discriminate initial and end transitions of said loop signal.

6. An amplitude regulator as defined in claim 4, further comprising a parallel connection between the input of a fundamental frequency amplifier and the input of at least a further amplifier of the higher frequency components, a filter provided in each connection of these higher frequency components, the boundaries of which are modified by a resistor, variable in response to fundamental frequency signals.

7. An amplitude regulator in combination with communication systems and/or with devices recognizing and/or recording image signals, speech signals, musical signals; said amplitude regulator comprising a first amplifier, the gain of which can be varied in reverse direction by a feedback loop chain in circuit with the first amplifier embodying a loop amplifier, a rectifier and a low-pass filter, a second amplifier, the input of said first amplifier being coupled with the input of said second amplifier, a feed forward loop chain in circuit with the second amplifier for varying the gain of said second amplifier in forward direction, said feed forward loop chain for said second amplifier comprising a loop amplifier, rectifier and a low-pass filter, the output signal of said first amplifier providing the input signal of said feed forward loop chain.

8. An amplitude regulator as defined in claim 7, wherein both loop amplifiers of the reverse and forward loops have similar gains so that the average value of the output level becomes nearly a linear function of the input level.

9. An amplitude regulator in combination with communication systems and/or with devices recognizing and/or recording image signals, speech signals, musical signals; said amplitude regulator comprising a first amplifier having an input, the gain of which can be varied in reverse direction by a feedback loop chain in circuit with the first amplifier embodying a loop amplifier, a rectifier and a low-pass filter, a second amplifier having an input, the input of said first amplifier being coupled with the input of said second amplifier, a forward loop chain in circuit with the second amplifier for varying the gain of said second amplifier in forward direction, the output signal of said first amplifier providing the input signal of said forward loop chain.

* * * * *